United States Patent
Dawson et al.

(10) Patent No.: US 7,698,519 B2
(45) Date of Patent: Apr. 13, 2010

(54) BACKUP OF HIERARCHICALLY STRUCTURED STORAGE POOLS

(75) Inventors: Colin Scott Dawson, Tucson, AZ (US); Howard Newton Martin, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 11/469,019

(22) Filed: Aug. 31, 2006

(65) Prior Publication Data

US 2008/0059731 A1  Mar. 6, 2008

(51) Int. Cl.
*G06F 13/00* (2006.01)
*G06F 13/28* (2006.01)

(52) U.S. Cl. .................. 711/162; 711/161; 711/154

(58) Field of Classification Search .............. None
See application file for complete search history.

(56) References Cited

U.S. PATENT DOCUMENTS

| | | | |
|---|---|---|---|
| 6,173,376 B1 | 1/2001 | Fowler et al. | |
| 6,266,784 B1 * | 7/2001 | Hsiao et al. | 714/6 |
| 6,393,540 B1 * | 5/2002 | Blumenau et al. | 711/165 |
| 6,640,278 B1 | 10/2003 | Nolan et al. | |
| 6,671,789 B1 | 12/2003 | He et al. | |
| 6,977,927 B1 | 12/2005 | Bates et al. | |
| 2002/0026558 A1 | 2/2002 | Reuter et al. | |
| 2004/0167972 A1 | 8/2004 | Demmon | |

FOREIGN PATENT DOCUMENTS

WO   2005017737 A2   2/2005

* cited by examiner

*Primary Examiner*—Kevin Verbrugge
*Assistant Examiner*—Eric S Cardwell
(74) *Attorney, Agent, or Firm*—Rabindranath Dutta; Konrad Raynes and Victor LLP (57) ABSTRACT

Provided are a system, method, and computer readable storage medium wherein at least two primary storage pools are configured, wherein a first primary storage pool is configured to indicate a second primary storage pool as a next storage pool in a storage hierarchy that comprises the first primary storage pool and the second primary storage pool. The first primary storage pool of the storage hierarchy is copied to a copy storage pool, wherein the first primary storage pool and the copy storage pool are included as parameters of a single command. The second primary storage pool is copied to the copy storage pool, in response to determining that the second primary storage pool is the next storage pool for the first primary storage pool in the storage hierarchy.

20 Claims, 9 Drawing Sheets

Exemplary Plurality of Commands for Backup

*< backup to ONSITE_COPY>*
402 — BACKUP STGPOOL DISKPOOL ONSITE_COPY
404 — BACKUP STGPOOL FASTTAPE ONSITE_COPY
406 — BACKUP STGPOOL SLOWTAPE ONSITE_COPY

*<backup to OFFSITE_COPY>*
408 — BACKUP STGPOOL DISKPOOL OFFSITE_COPY
410 — BACKUP STGPOOL FASTTAPE OFFSITE_COPY
412 — BACKUP STGPOOL SLOWTAPE OFFSITE_COPY

BACKUP OF HIERARCHICALLY STRUCTURED STORAGE POOLS

BACKGROUND

1. Field

The disclosure relates to a method, system, and article of manufacture for the backup of hierarchically structured storage pools.

2. Background

A storage manager, such as, the Tivoli* Storage Manager* (TSM) product marketed by International Business Machines (IBM*) Corporation, may be used for securely storing and backing up data. The storage manager may execute in a storage management server, such as, a TSM server, and assure data integrity and provide the ability to protect business critical data in the event of hardware, software and environmental failures. The storage manager may maintain an image of the data and programs on storage media, such as, disks or tape cartridges. In the event of a system failure or other event that results in a loss of data, the storage manager may be used to restore the data and programs from the available storage media.

IBM, Tivoli, and Tivoli Storage Manager are trademarks or registered trademarks of IBM Corporation.

The TSM may provide data storage services to clients, such as TSM clients, for backup, archive, or space management of data. The TSM server may store files sent to the TSM server by one or more TSM clients. The storage manager may allow a system administrator to configure storage pools, where a storage pool comprises a group of devices used for storing data received from the TSM client. Storage pools are used as targets for store operations from the TSM client and are referenced in TSM server policies and other constructs for processing.

Storage pools can be organized into a storage hierarchy such that one pool has a "next" pool. For example, if there is a first pool referred to as "DISKPOOL", then the pool "DISKPOOL" may be configured to have a next pool referred to as "TAPEPOOL". Logically, such a configuration may represent a hierarchy with "DISKPOOL" being the first pool in the hierarchy and "TAPEPOOL" being the next pool in the hierarchy.

Storage media within the storage hierarchy may thus be grouped into data structures referred to as storage pools. Data being stored from a TSM client to a TSM server is directed to a primary storage pool based on policies defined by the system administrator. Once the data has been stored in the storage hierarchy, a copy can be made for the purposes of creating a backup of the data. The system administrator may either manually or through a scheduled event begin backing up the data to a copy storage pool. The copy storage pool is a type of storage pool used for storing duplicate copies of the data that is stored in the primary storage pool hierarchy. These copy pools are used to protect against media failure and may also be used to transfer storage volumes offsite to a remote vault location for disaster recovery services. Copy pools may used for restoring data in the event of a data loss. In certain TSM implementations, all pools in a primary storage pool hierarchy may be backed up to the same copy storage pool.

SUMMARY OF THE DESCRIBED EMBODIMENTS

Provided are a system, method, and article of manufacture wherein at least two primary storage pools are configured, wherein a first primary storage pool is configured to indicate a second primary storage pool as a next storage pool in a storage hierarchy that comprises the first primary storage pool and the second primary storage pool. The first primary storage pool of the storage hierarchy is copied to a copy storage pool, wherein the first primary storage pool and the copy storage pool are included as parameters of a single command. The second primary storage pool is copied to the copy storage pool, in response to determining that the second primary storage pool is the next storage pool for the first primary storage pool in the storage hierarchy.

In certain additional embodiments, the copy storage pool is a single copy storage pool, wherein a parameter associated with the single command is set to indicate that all primary storage pools in the storage hierarchy are to be copied to the single copy storage pool.

In certain additional embodiments, a plurality of existing commands that together copy the first primary storage pool to the single copy storage pool and copy the second primary storage pool to the single copy storage pool are replaced by the single command.

In further embodiments, the configuring, the copying of the first storage pool, and the copying of the second storage pool are performed by a storage manager in a storage server in communication with a client. The second primary storage pool is configured to be lower in the storage hierarchy in comparison to the first primary storage pool. The storage manager in the storage server receives the single command from the client.

In yet further embodiments, the storage hierarchy comprises a third primary storage pool that is lower in the storage hierarchy in comparison to the second primary storage pool, wherein the first primary storage pool includes a first plurality of storage media, wherein the second primary storage pool includes a second plurality of storage media that responds faster than a third plurality of storage media included in the third primary storage pool, and wherein the third primary storage pool is copied to the copy storage pool.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Backing Up Via a Plurality of Commands

In certain storage servers, each primary storage pool may need a schedule or administrator intervention to cause a primary storage pool to be backed up to a copy storage pool. For example, for two primary pools "DISKPOOL" and "TAPEPOOL" to be backed up to a single copy storage pool referred to as "COPYPOOL", an administrator may need to issue two commands:

---
(i) BACKUP STGPOOL DISKPOOL COPYPOOL;
(ii) BACKUP STGPOOL TAPEPOOL COPYPOOL.
---

In certain situations, an administrative schedule may be created to issue both commands. In either case, a plurality of commands to copy primary storage pools to a single copy storage pool adds to the administrative complexity of the storage server by causing the storage server to become more difficult to setup and configure. More commands have to be issued and more administrative schedules may have to be monitored and evaluated for success or failure.

Besides the difficulty of managing the backup of primary storage pools to copy pools and the schedules associated with the backup, there is a possibility that if the plurality of backup commands are not setup properly, some data may not be backed up to the copy pool and may not be available for recovery. For example, a system administrator may establish a schedule to backup "DISKPOOL" but may fail to establish a schedule for "TAPEPOOL". If data in "DISKPOOL" is moved to "TAPEPOOL" before being backed up to "COPYPOOL", then no copies would be available for recovery in the event of failure of the "TAPEPOOL". Such errors may cause customers to loose valuable data.

Backing Up Via a Single Command

Certain embodiments, allow a single command to traverse a storage hierarchy and backup the data stored in the plurality of primary storage pools of the storage hierarchy to the target copy storage pool.

Figure 1:
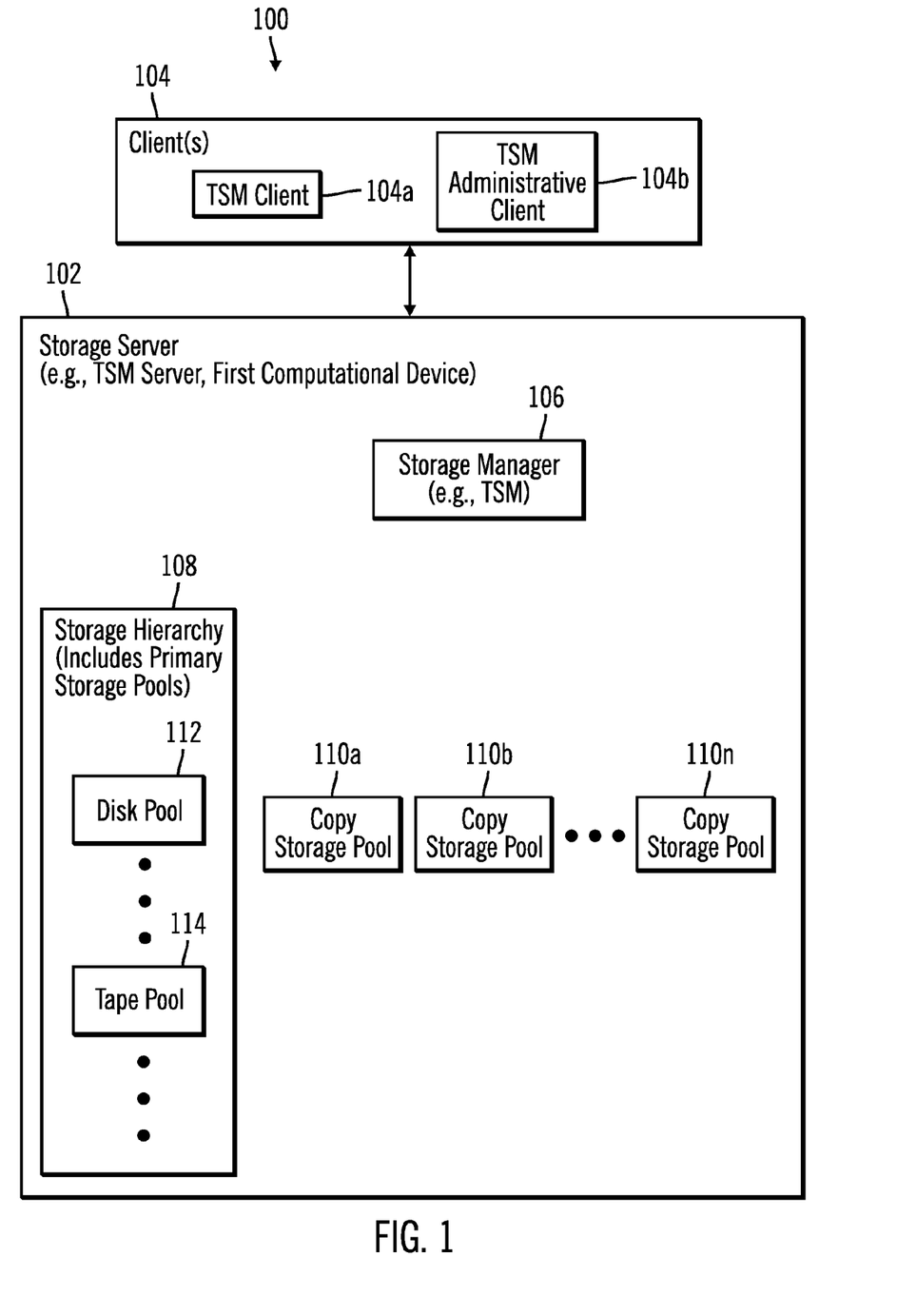
FIG. 1 illustrates a block diagram of a computing environment in accordance with certain embodiments.

FIG. 1 illustrates a block diagram of a computing environment 100 in accordance with certain embodiments. The computing environment 100 includes a first computational device, such as, a storage server 102, coupled to one or more computational devices, such as, clients 104.

In certain embodiments, the storage server 102 and the clients 104 may comprise any suitable computational device, including those presently known in the art, such as, a personal computer, a workstation, a mainframe, a midrange computer, a network appliance, a palm top computer, a telephony device, a blade computer, a hand held computer, etc. In certain exemplary embodiments, the storage server 102 may comprise a TSM server, and the client 104 may comprise a TSM client.

The storage server 102 and the clients 104 may communicate directly or via any suitable network, including those presently known in the art, such as, a storage area network (SAN), a local area network (LAN), an Intranet, the Internet, etc.

The storage server 102 includes an application, such as, a storage manager 106, a storage hierarchy 108 of primary storage pools, and a plurality of copy storage pools 110a, 110b, . . . 110n.

Exemplary primary storage pools in the storage hierarchy 108 may include a disk pool 112 and a tape pool 114. In certain embodiments, the tape pool 114 may be lower in the storage hierarchy 108 in comparison to the disk pool 112. In certain embodiments, the disk pool 112 may comprise direct access storage, such as hard disks, and the tape pool 114 may comprise sequential storage, such as, tapes. In certain embodiments, the copy storage pools 110a . . . 110n may comprise sequential storage, such as tapes. The storage hierarchy 108 is not limited to disks and tapes but can include other storage media. In certain embodiments, tapes in the tape pool 114 may be emulated by storing data on one or more disks and writing the data in a logically sequential manner.

The clients 104 may include a TSM client 104a that backs up and restores data corresponding to the TSM client 104a from the storage server 102. The clients 104 may also include a TSM administrative client 104b that may control the storage manager 106 and may monitor operations performed by the storage server 106. The TSM administrative client 104b may be capable of issuing commands for the purpose of configuring and driving operations on the storage server 102. In additional embodiments the TSM administrative client 104b may also monitor the state of the storage server 102 and may determine whether the storage server 102 is operating properly. The TSM administrative client 104b may initiate storage pool backups and may also define the schedules that automatically carry out the storage pool backups. While FIG. 1 shows a separate TSM client 104a and a separate TSM administrative client 104b, in certain embodiments one or more clients 104 may perform the operations performed by the TSM client 104a and the TSM administrative client 104b. For the purposes of the disclosure, an operation described as being performed by the client 104 may include operations performed by either the TSM client 104a or the TSM administrative client 104b.

In certain embodiments, the client 104 sends a single command to the storage server 102, where the single command allows a plurality of primary storage pools of the storage hierarchy 108 to be copied to a single copy storage pool, such as copy storage pool, 110a. The copy storage pool to which a plurality of primary storage pools are to be copied may be indicated as a parameter of the single command. The storage hierarchy 108 may be defined by an administrator, the storage manager 106, or by an application that runs on the client 104.

Therefore, FIG. 1 illustrates an embodiment in which the storage manager 106 copies a plurality of primary storage pools of a storage hierarchy 108 to a single copy storage pool in response to a single command. In certain embodiments, it is not necessary for all of the plurality of primary storage pools of the storage hierarchy 108 to be copied to a single copy storage pool.

Figure 2:
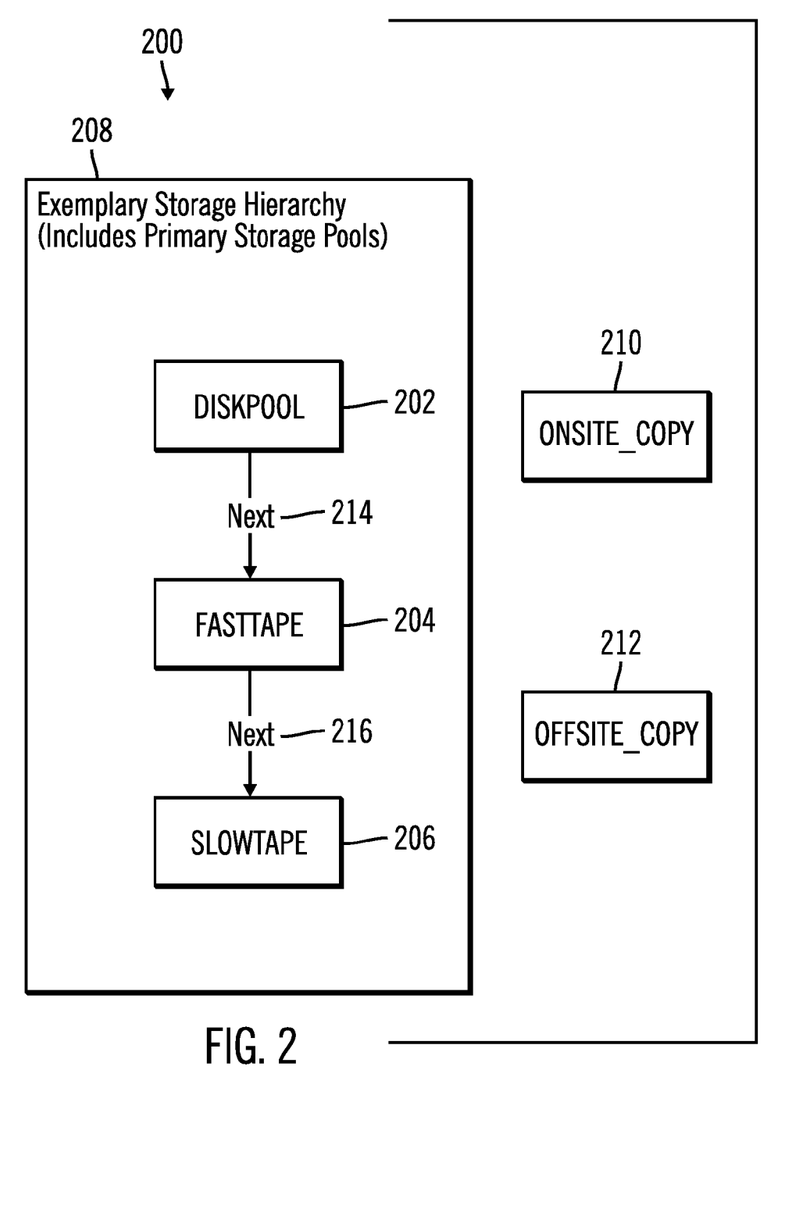
FIG. 2 illustrates a block diagram that shows exemplary primary storage pools of an exemplary storage hierarchy that may be copied to exemplary copy storage pools, in accordance with certain embodiments.

FIG. 2 illustrates a block diagram corresponding to a computing environment 200 that shows how three exemplary primary storage pools comprising "DISKPOOL" 202, "FASTTAPE" 204, "SLOWTAPE" 206 of an exemplary storage hierarchy 208 may be copied to exemplary copy storage pools "ONSITE_COPY" 210 and "OFFSITE_COPY" 212, in accordance with certain embodiments.

In FIG. 2, the "DISKPOOL" 202 includes a plurality of disks, the "FASTTAPE" 204 includes a first plurality of tapes that respond faster than a second plurality of tapes included in the "SLOWTAPE" 206. In the exemplary storage hierarchy 208, the "DISKPOOL" 202 is highest in the storage hierarchy, the next (reference numeral 214) primary storage pool in the exemplary storage hierarchy 208 after the "DISKPOOL" 202 is the "FASTTAPE" 204, and the next (reference numeral 216) primary storage pool in the exemplary storage hierarchy 208 after the "FASTTAPE" 204 is the "SLOWTAPE" 206.

In certain embodiments, the "ONSITE_COPY" 210 is a copy storage pool that stores backups of the primary storage pools for retention in the site where the storage server 102 is located, whereas the "OFFSITE_COPY" 212 is a copy storage pool that stores backups of the primary storage pools for retention at a site that is different from the site where the storage server 102 is located.

In certain embodiments, a single command received by the storage manager 106 can copy the primary storage pools "DISKPOOL" 202, "FASTTAPE" 204, and "SLOWTAPE" 206 to either the "ONSITE_COPY" 210 of the "OFFSITE_COPY" 212 copy storage pools.

Figure 3:
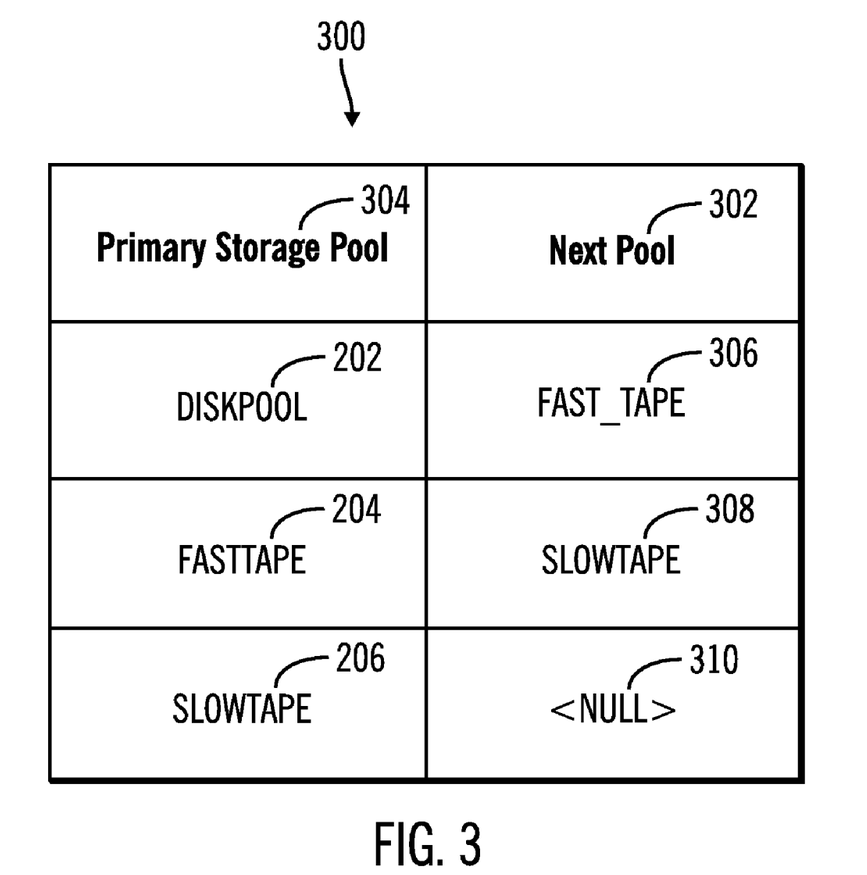
FIG. 3 illustrates a data structure indicating next pools for exemplary primary storage pools in an exemplary storage hierarchy, in accordance with certain embodiments.

FIG. 3 illustrates a data structure 300 indicating next pools 302, also referred to as next storage pools, corresponding to exemplary primary storage pools 304 in the exemplary storage hierarchy 208, in accordance with certain embodiments. In FIG. 3, the next pool 302 for the "DISKPOOL" 202 is indicated as "FAST_TAPE" (reference numeral 306), the next pool 302 for "FAST_TAPE" 204 is indicated as "SLOW_TAPE" (reference numeral 308) and the next pool 302 for "SLOWTAPE" 206 is indicated as "NULL". Therefore, the data structure 300 may represent the exemplary storage hierarchy 208 shown earlier in FIG. 2.

Figure 4:
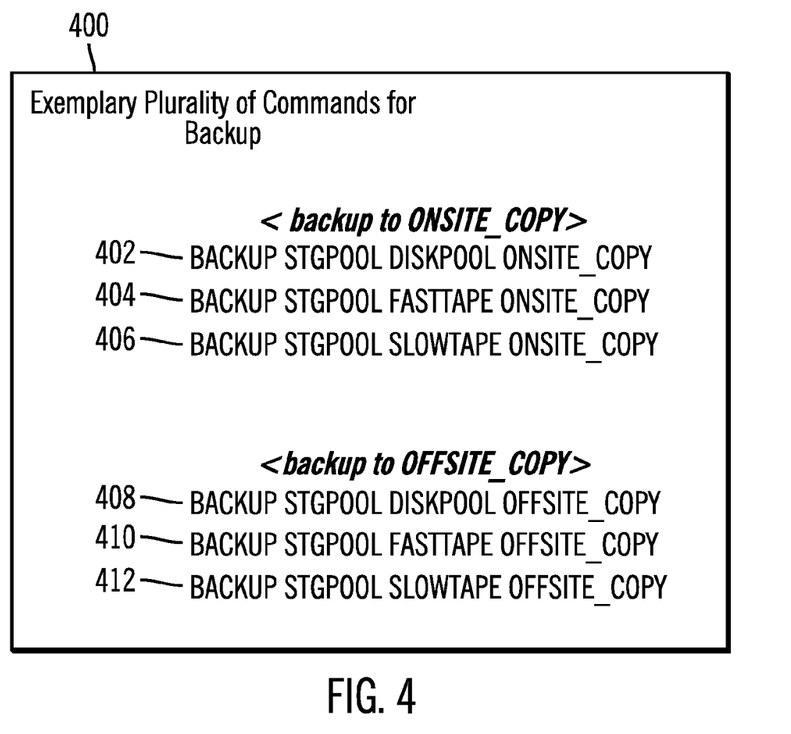
FIG. 4 illustrates how exemplary primary storage pools in a storage hierarchy may be copied to the same copy storage pool via a plurality of commands.

FIG. 4 illustrates how exemplary primary storage pools 202, 204, 206 in the storage hierarchy 208 may be copied to the same copy storage pool via an exemplary plurality of commands 400.

A set of three commands 402, 404, 406 may be used to copy the storage hierarchy 208 comprising the primary storage pools referred to as "DISKPOOL" 202, "FASTTAPE" 204, and "SLOWTAPE" 206 to the copy storage pool referred to as "ONSITE_COPY" 210. Similarly, another set of three commands 408, 410, 412 may be used to copy the storage hierarchy 208 comprising the primary storage pools referred to as "DISKPOOL" 202, "FASTTAPE" 204, and "SLOWTAPE" 206 to the copy storage pool referred to as "OFFSITE_COPY" 212.

In certain situations, an administrative schedule may be used to create the set of three commands 402, 404, 406 or the set of three commands 408, 410, 412. In either case, a plurality of commands to copy primary storage pools to a single copy storage pool adds to the administrative complexity of the storage server 102 by causing the storage server 102 to become more difficult to setup, configure, and monitor.

Figure 5:
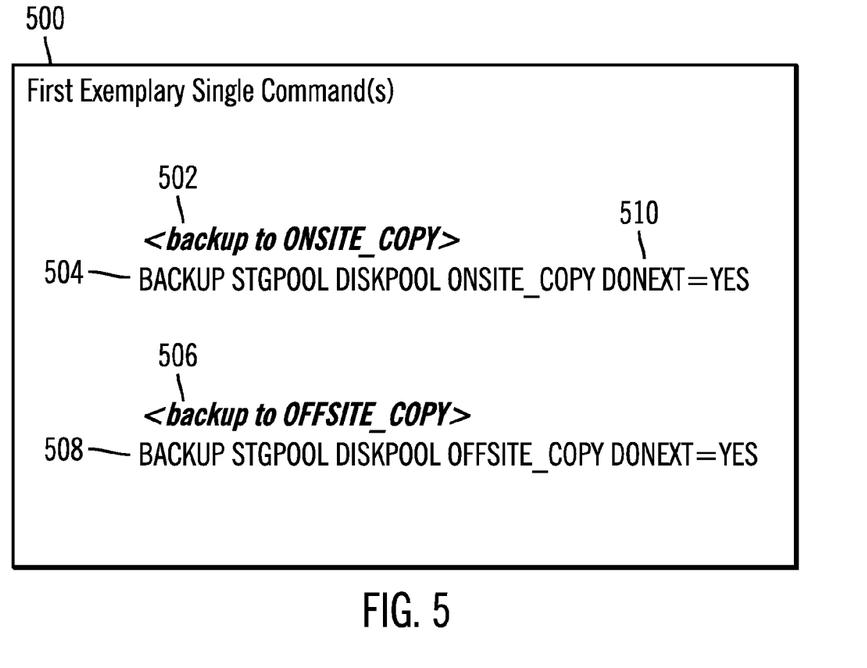
FIG. 5 illustrates how exemplary primary storage pools in a storage hierarchy may be copied to the same copy storage pool via a first exemplary single command.

FIG. 5 illustrates how exemplary primary storage pools 202, 204, 206 in the storage hierarchy 208 may be copied to the same copy storage pool via a first exemplary single command 500.

In certain embodiments, a backup 502 of the exemplary primary storage pools 202, 204, 206 of the storage hierarchy 208 to the copy storage pool "ONSITE_COPY" 210 may be performed via a single command 504. Additionally, a backup 506 of the exemplary primary storage pools 202, 204, 206 of the storage hierarchy 208 to the copy storage pool "OFFSITE_COPY" 212 may be performed via a single command 508.

FIG. 5 shows how a parameter "DONEXT" 510 has been added to the BACKUP STGPOOL command 504. The parameter "DONEXT" 510 that may be set to "yes" or "no", may indicate whether or not the storage pool backup processing is supposed to traverse to the next pool 302 listed for the primary storage pool 304 and back up the next pool 302 as well. For example, the data structures 300 may be used by the BACKUP STGPOOL command 504 to first copy the "DISKPOOL" 202 TO THE "ONSITE_COPY" 210, then the next pool 302 is determined to be the "FASTTAPE" 204 that is copied to the "ONSITE_COPY" 210, and then the next pool 302 is determined to be the "SLOWTAPE" 206 that is copied to the "ONSITE_COPY 210".

Figure 6:
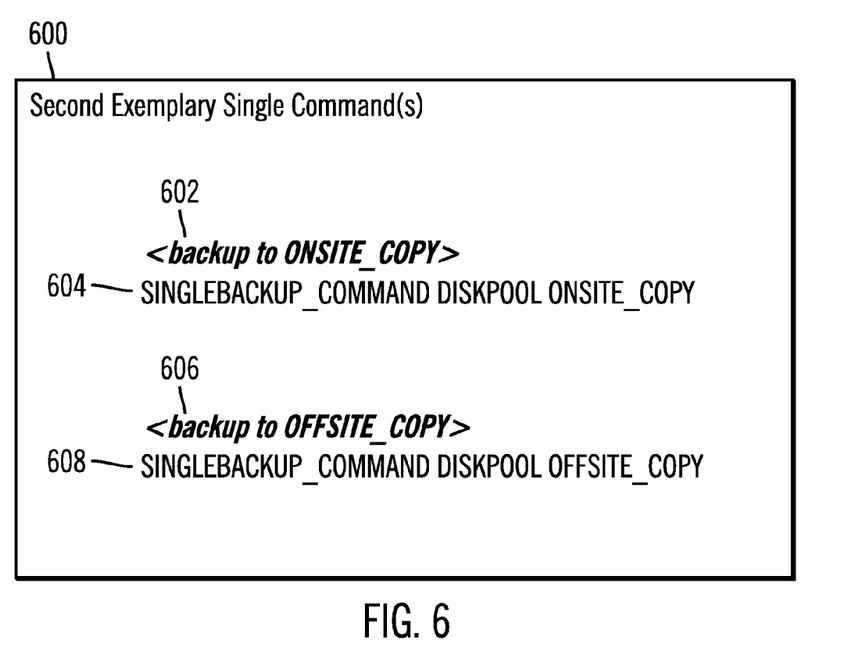
FIG. 6 illustrates how exemplary primary storage pools in a storage hierarchy may be copied to the same copy storage pool via a second exemplary single command.

FIG. 6 illustrate how exemplary primary storage pools 202, 204, 206 in the storage hierarchy 208 may be copied to the same copy storage pool via a second exemplary single command 600.

In certain embodiments, a backup 602 of the exemplary primary storage pools 202, 204, 206 of the storage hierarchy 208 to the copy storage pool "ONSITE_COPY" 210 may be performed via a single command 604. Additionally, a backup 606 of the exemplary primary storage pools 202, 204, 206 of the storage hierarchy 208 to the copy storage pool "OFFSITE_COPY" 212 may be performed via a single command 608.

FIG. 6 shows that a parameter "DONEXT" 510 does not have to be added to the BACKUP STGPOOL command 504. Rather, a new command named "SINGLEBACKUP_COMMAND" 604 may indicate whether or not the storage pool backup processing is supposed to traverse to the next pool 302 listed for the primary storage pool 304 and back up the next pool 302 as well. For example, the data structures 300 may be used by the "SINGLEBACKUP_COMMAND" 604 to first copy the "DISKPOOL" 202 TO THE "ONSITE_COPY" 210, then the next pool 302 is determined to be the "FASTTAPE" 204 that is copied to the "ONSITE_COPY" 210, and then the next pool 302 is determined to be the "SLOWTAPE" 206 that is copied to the "ONSITE_COPY 210".

Therefore, FIG. 5 and FIG. 6 illustrate how a single command may be used to replace a plurality of commands to copy a plurality of primary storage pools of a storage hierarchy to single copy storage pool.

Figure 7:
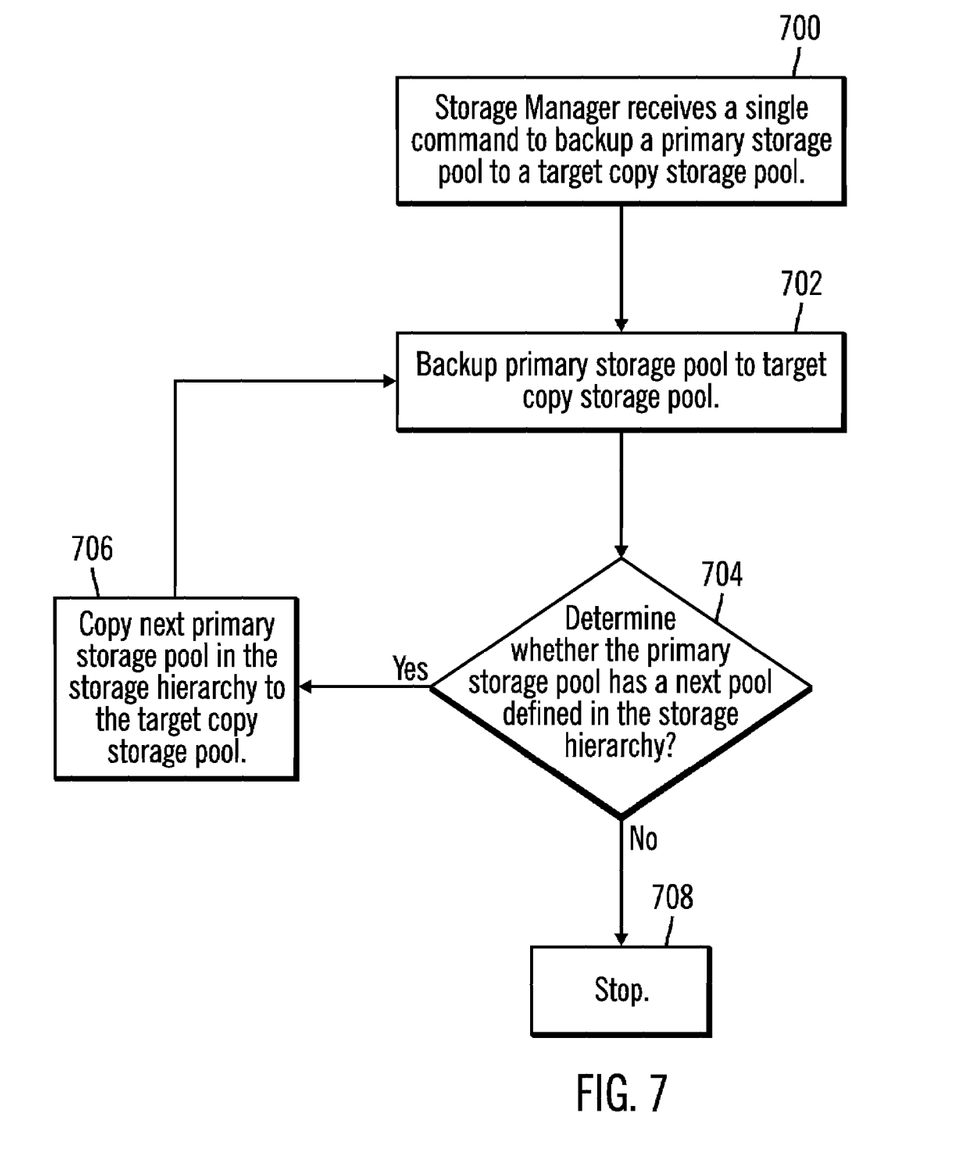
FIG. 7 illustrates a first flowchart for the backup of hierarchically structured storage pools, in accordance with first exemplary embodiments.

FIG. 7 illustrates a first flowchart for the backup of hierarchically structured primary storage pools, in accordance with first exemplary embodiments. The operations shown in FIG. 7 may be implemented in the storage server 102 by the storage manager 106.

Control starts at block 700 where the storage manager 106 receives a single command 602 to backup a primary storage pool, such as the "DISKPOOL" 202 to a target copy storage pool, such as, "ONSITE_COPY" 210.

The storage manager 106 backs up (at block 702) the primary storage pool to target copy storage pool. For example, the storage manager 106 may backup the "DISKPOOL" 202 to "ONSITE_COPY" 210.

The storage manager 106 determines (at block 704) whether the primary storage pool 304 has a next pool 302 defined in the storage hierarchy 208. For example, the data structures 300 may be used to make the determination of whether the primary storage pool 304 has a next pool 302 defined in the storage hierarchy 208.

If a determination is made at block 704 that the primary storage pool 304 has a next pool 302 defined in the storage hierarchy 208, then the storage manager 106 copies (at block 706) the next primary storage pool 302 in the storage hierarchy 208 to the target copy storage pool, such as "ONSITE- _COPY" 210. Control returns to block 702 for further backups to the target copy storage pool.

If a determination is made at block 704 that the primary storage pool 304 does not have a next pool 302 defined in the storage hierarchy 208, then the process stops (at block 708).

Figure 8:
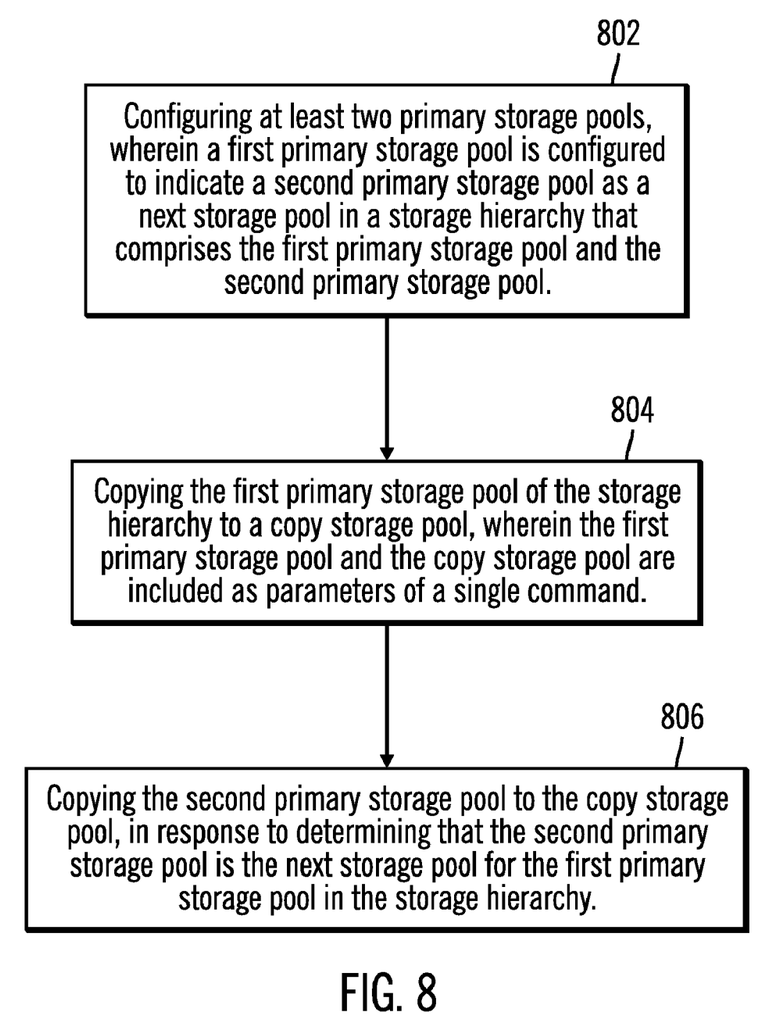
FIG. 8 illustrates a second flowchart for the backup of hierarchically structured storage pools, in accordance with second exemplary embodiments.

FIG. 8 illustrates a second flowchart for the backup of hierarchically structured storage pools, in accordance with second exemplary embodiments. The operations shown in the flowchart of FIG. 8 may be performed in the computing environment 100.

Control starts at block 800, in which at least two primary storage pools are configured, wherein a first primary storage pool is configured to indicate a second primary storage pool as a next storage pool in a storage hierarchy 108 that comprises the first primary storage pool and the second primary storage pool. For example, in a storage hierarchy 108 comprised of a disk pool 112 and a tape pool 114, the tape pool 114 may be indicated as the next storage pool in the storage hierarchy after the disk pool 112.

The storage manager 106 copies (at block 802) the first primary storage pool of the storage hierarchy 108 to a copy storage pool 110a, wherein the first primary storage pool and the copy storage pool 110a are included as parameters of a single command. For example, in certain embodiments, the single command 504, 604 may be used to start copying the first primary storage pool.

The storage manager 106 copies (at block 804) the second primary storage pool to the copy storage pool 110a, in response to determining that the second primary storage pool is the next storage pool for the first primary storage pool in the storage hierarchy 108. The next storage pool may be determined from a data structure that indicates next storage pools corresponding to primary storage pools.

Therefore, FIG. 7 and FIG. 8 illustrate certain embodiments in which a single command is used to traverse a storage hierarchy and backup the data stored in a plurality of primary storage pools of the storage hierarchy to a single target copy storage pool. The need to coordinate and manage a plurality of commands to backup a plurality of primary storage pools of a storage hierarchy to a single target copy storage pool is no longer necessary with the embodiments illustrated in FIG. 7 and FIG. 8.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Further, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 9:
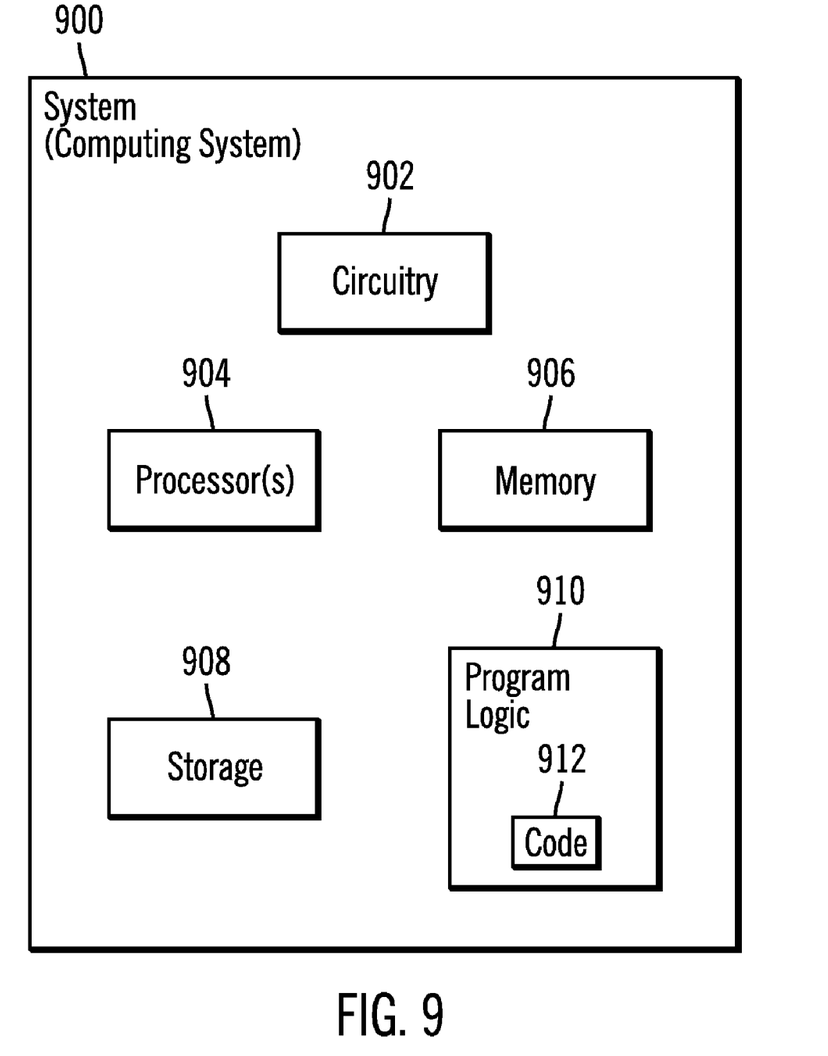
FIG. 9 illustrates a system in which certain embodiments are implemented.

FIG. 9 illustrates the architecture of computing system, wherein in certain embodiments the computational device 102 of the computing environment of FIG. 1 may be implemented in accordance with the architecture of the computing system. The computing system 900 may also be referred to as a system, and may include a circuitry 902 that may in certain embodiments include a processor 904. The system 900 may also include a memory 906 (e.g., a volatile memory device), and storage 908. The storage 908 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-9 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-9 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
    configuring at least two primary storage pools, wherein a first primary storage pool is configured to indicate a second primary storage pool as a next storage pool in a storage hierarchy that comprises the first primary storage pool and the second primary storage pool;
    copying the first primary storage pool of the storage hierarchy to a single copy storage pool, wherein the first primary storage pool and the single copy storage pool are included as parameters of a single command;
    determining whether a parameter associated with the single command is set to indicate that all primary storage pools in the storage hierarchy are to be copied to the single copy storage pool;
    in response to determining that the parameter associated with the single command is set to indicate that all primary storage pools in the storage hierarchy are to be copied to the single copy storage pool, copying the second primary storage pool to the single copy storage pool; and
    in response to determining that the parameter associated with the single command is not set to indicate that all primary storage pools in the storage hierarchy are to be copied to the single copy storage pool, avoiding copying the second primary storage pool to the single copy storage pool.

2. The method of claim 1, wherein the configuring, the copying of the first storage pool, and the copying of the second storage pool are performed by a storage manager in a storage server in communication with a client, the method further comprising:
    configuring, the second primary storage pool to be lower in the storage hierarchy in comparison to the first primary storage pool; and
    receiving, by the storage manager in the storage server, the single command from the client.

3. The method of claim 2, wherein the storage hierarchy comprises a third primary storage pool that is lower in the storage hierarchy in comparison to the second primary storage pool, wherein the first primary storage pool includes a first plurality of storage media, wherein the second primary storage pool includes a second plurality of storage media that responds faster than a third plurality of storage media included in the third primary storage pool, the method further comprising:
    copying the third primary storage pool to the single copy storage pool, in response to determining that the parameter associated with the single command is set to indicate that all primary storage pools in the storage hierarchy are to be copied to the single copy storage pool.

4. The method of claim 1, wherein the parameter is a fourth parameter of a plurality of parameters of the single command, and wherein the single command comprises:
    a first parameter that is a backup command;
    a second parameter that indicates the first primary storage whose level is highest in the storage hierarchy;
    a third parameter that indicates the single copy storage pool; and
    the fourth parameter.

5. The method of claim 4, wherein a plurality of existing commands that together copy the first primary storage pool to the single copy storage pool and copy the second primary storage pool to the single copy storage pool are replaced by the single command when the fourth parameter associated with the single command is set to indicate that all primary storage pools in the storage hierarchy are to be copied to the single copy storage pool, and wherein the plurality of existing commands that are replaced by the single command comprise:
   a first command that copies the first primary storage pool to the single copy storage pool; and
   a second command that copies the second primary storage pool to the single copy storage pool, wherein the second primary storage pool is lower in the storage hierarchy in comparison the first primary storage pool, and wherein:
      the first primary storage pool is pool of disks and the second primary storage pool is a pool of tapes; and
      in response to a failure to establish a schedule for the second command, copies for the pool of tapes are unavailable for recovery in an event of a failure of the pool of tapes.

6. A method for deploying computing infrastructure, comprising integrating computer-readable code stored in a computer readable storage medium into a computing system, wherein the code in combination with the computing system is capable of performing:
   configuring at least two primary storage pools, wherein a first primary storage pool is configured to indicate a second primary storage pool as a next storage pool in a storage hierarchy that comprises the first primary storage pool and the second primary storage pool;
   copying the first primary storage pool of the storage hierarchy to a single copy storage pool, wherein the first primary storage pool and the single copy storage pool are included as parameters of a single command;
   determining whether a parameter associated with the single command is set to indicate that all primary storage pools in the storage hierarchy are to be copied to the single copy storage pool;
   in response to determining that the parameter associated with the single command is set to indicate that all primary storage pools in the storage hierarchy are to be copied to the single copy storage pool, copying the second primary storage pool to the single copy storage pool; and
   in response to determining that the parameter associated with the single command is not set to indicate that all primary storage pools in the storage hierarchy are to be copied to the single copy storage pool, avoiding copying the second primary storage pool to the single copy storage pool.

7. The method for deploying computing infrastructure of claim 6, wherein the configuring, the copying of the first storage pool, and the copying of the second storage pool are performed by a storage manager in a storage server in communication with a client, wherein the code in combination with the computing system is further capable of performing:
   configuring, the second primary storage pool to be lower in the storage hierarchy in comparison to the first primary storage pool; and
   receiving, by the storage manager in the storage server, the single command from the client.

8. The method for deploying computing infrastructure of claim 7, wherein the storage hierarchy comprises a third primary storage pool that is lower in the storage hierarchy in comparison to the second primary storage pool, wherein the first primary storage pool includes a first plurality of storage media, wherein the second primary storage pool includes a second plurality of storage media that responds faster than a third plurality of storage media included in the third primary storage pool, and wherein the code in combination with the computing system is further capable of performing:
   copying the third primary storage pool to the single copy storage pool, in response to determining that the parameter associated with the single command is set to indicate that all primary storage pools in the storage hierarchy are to be copied to the single copy storage pool.

9. The method for deploying computing infrastructure of claim 6, wherein the parameter is a fourth parameter of a plurality of parameters of the single command, and wherein the single command comprises:
   a first parameter that is a backup command;
   a second parameter that indicates the first primary storage whose level is highest in the storage hierarchy;
   a third parameter that indicates the single copy storage pool; and
   the fourth parameter.

10. The method for deploying computing infrastructure of claim 9, wherein a plurality of existing commands that together copy the first primary storage pool to the single copy storage pool and copy the second primary storage pool to the single copy storage pool are replaced by the single command when the fourth parameter associated with the single command is set to indicate that all primary storage pools in the storage hierarchy are to be copied to the single copy storage pool, and wherein the plurality of existing commands that are replaced by the single command comprise:
   a first command that copies the first primary storage pool to the single copy storage pool; and
   a second command that copies the second primary storage pool to the single copy storage pool, wherein the second primary storage pool is lower in the storage hierarchy in comparison the first primary storage pool, and wherein:
      the first primary storage pool is pool of disks and the second primary storage pool is a pool of tapes; and
      in response to a failure to establish a schedule for the second command, copies for the pool of tapes are unavailable for recovery in an event of a failure of the pool of tapes.

11. A system, comprising:
   a memory;
   at least two primary storage pools in communication with the memory;
   a single copy storage pool in communication with the memory; and
   a processor, wherein the processor is coupled to the memory, and wherein the processor executes operations, the operations comprising:
   configuring at least two primary storage pools, wherein a first primary storage pool is configured to indicate a second primary storage pool as a next storage pool in a storage hierarchy that comprises the first primary storage pool and the second primary storage pool;
   copying the first primary storage pool of the storage hierarchy to a single copy storage pool, wherein the first primary storage pool and the single copy storage pool are included as parameters of a single command;
   determining whether a parameter associated with the single command is set to indicate that all primary storage pools in the storage hierarchy are to be copied to the single copy storage pool;
   in response to determining that the parameter associated with the single command is set to indicate that all primary storage pools in the storage hierarchy are to be copied to the single copy storage pool, copying the second primary storage pool to the single copy storage pool; and
   in response to determining that the parameter associated with the single command is not set to indicate that all primary storage pools in the storage hierarchy are to be copied to the single copy storage pool, avoiding copying the second primary storage pool to the single copy storage pool.

12. The system of claim 11, wherein the configuring, the copying of the first storage pool, and the copying of the second storage pool are performed by a storage manager in a storage server in communication with a client, the operations further comprising:

configuring, the second primary storage pool to be lower in the storage hierarchy in comparison to the first primary storage pool; and receiving, by the storage manager in the storage server, the single command from the client.

13. The system of claim 12, wherein the storage hierarchy comprises a third primary storage pool that is lower in the storage hierarchy in comparison to the second primary storage pool, wherein the first primary storage pool includes a first plurality of storage media, wherein the second primary storage pool includes a second plurality of storage media that responds faster than a third plurality of storage media included in the third primary storage pool, and wherein the operations further comprise:

copying the third primary storage pool to the single copy storage pool, in response to determining that the parameter associated with the single command is set to indicate that all primary storage pools in the storage hierarchy are to be copied to the single copy storage pool.

14. The system of claim 11, wherein the parameter is a fourth parameter of a plurality of parameters of the single command, and wherein the single command comprises:

a first parameter that is a backup command;

a second parameter that indicates the first primary storage whose level is highest in the storage hierarchy;

a third parameter that indicates the single copy storage pool; and the fourth parameter.

15. The system of claim 14, wherein a plurality of existing commands that together copy the first primary storage pool to the single copy storage pool and copy the second primary storage pool to the single copy storage pool are replaced by the single command when the fourth parameter associated with the single command is set to indicate that all primary storage pools in the storage hierarchy are to be copied to the single copy storage pool, and wherein the plurality of existing commands that are replaced by the single command comprise:

a first command that copies the first primary storage pool to the single copy storage pool; and a second command that copies the second primary storage pool to the single copy storage pool, wherein the second primary storage pool is lower in the storage hierarchy in comparison the first primary storage pool, and wherein:

the first primary storage pool is pool of disks and the second primary storage pool is a pool of tapes; and in response to a failure to establish a schedule for the second command, copies for the pool of tapes are unavailable for recovery in an event of a failure of the pool of tapes.

16. A computer readable storage medium, wherein code stored in the computer readable storage medium when executed by a computer performs operations, the operations comprising:

configuring at least two primary storage pools, wherein a first primary storage pool is configured to indicate a second primary storage pool as a next storage pool in a storage hierarchy that comprises the first primary storage pool and the second primary storage pool;

copying the first primary storage pool of the storage hierarchy to a single copy storage pool, wherein the first primary storage pool and the single copy storage pool are included as parameters of a single command;

determining whether a parameter associated with the single command is set to indicate that all primary storage pools in the storage hierarchy are to be copied to the single copy storage pool;

in response to determining that the parameter associated with the single command is set to indicate that all primary storage pools in the storage hierarchy are to be copied to the single copy storage pool, copying the second primary storage pool to the single copy storage pool; and in response to determining that the parameter associated with the single command is not set to indicate that all primary storage pools in the storage hierarchy are to be copied to the single copy storage pool, avoiding copying the second primary storage pool to the single copy storage pool.

17. The computer readable storage medium of claim 16, wherein the configuring, the copying of the first storage pool, and the copying of the second storage pool are performed by a storage manager in a storage server in communication with a client, the operations further comprising:

configuring, the second primary storage pool to be lower in the storage hierarchy in comparison to the first primary storage pool; and receiving, by the storage manager in the storage server, the single command from the client.

18. The computer readable storage medium of claim 17, wherein the storage hierarchy comprises a third primary storage pool that is lower in the storage hierarchy in comparison to the second primary storage pool, wherein the first primary storage pool includes a first plurality of storage media, wherein the second primary storage pool includes a second plurality of storage media that responds faster than a third plurality of storage media included in the third primary storage pool, and wherein the operations further comprise:

copying the third primary storage pool to the single copy storage pool, in response to determining that the parameter associated with the single command is set to indicate that all primary storage pools in the storage hierarchy are to be copied to the single copy storage pool.

19. The computer readable storage medium of claim 16, wherein the parameter is a fourth parameter of a plurality of parameters of the single command, and wherein the single command comprises:

a first parameter that is a backup command;

a second parameter that indicates the first primary storage whose level is highest in the storage hierarchy;

a third parameter that indicates the single copy storage pool; and the fourth parameter.

20. The computer readable storage medium of claim 19, wherein a plurality of existing commands that together copy the first primary storage pool to the single copy storage pool and copy the second primary storage pool to the single copy storage pool are replaced by the single command when the fourth parameter associated with the single command is set to indicate that all primary storage pools in the storage hierarchy are to be copied to the single copy storage pool, and wherein the plurality of existing commands that are replaced by the single command comprise:

a first command that copies the first primary storage pool to the single copy storage pool; and a second command that copies the second primary storage pool to the single copy storage pool, wherein the second primary storage pool is lower in the storage hierarchy in comparison the first primary storage pool, and wherein: the first primary storage pool is pool of disks and the second primary storage pool is a pool of tapes; and in response to a failure to establish a schedule for the second command, copies for the pool of tapes are unavailable for recovery in an event of a failure of the pool of tapes.

* * * * *